(12) United States Patent
Pirault et al.

(10) Patent No.: US 7,690,337 B2
(45) Date of Patent: Apr. 6, 2010

(54) SPARK PLUG LOCATION FOR SPLIT-CYCLE ENGINE

(75) Inventors: Jean Pierre Pirault, Shoreham-by-Sea (GB); Ian P. Gilbert, Shoreham-by-Sea (GB)

(73) Assignee: Scuderi Group, LLC, West Springfield, MA (US)

( * ) Notice: Subject to any disclaimer, the term of this patent is extended or adjusted under 35 U.S.C. 154(b) by 0 days.

(21) Appl. No.: 12/157,459

(22) Filed: Jun. 11, 2008

(65) Prior Publication Data

US 2009/0038596 A1 Feb. 12, 2009

Related U.S. Application Data

(60) Provisional application No. 60/963,742, filed on Aug. 7, 2007.

(51) Int. Cl.
*F02B 33/00* (2006.01)
*F02B 25/00* (2006.01)
(52) U.S. Cl. ...................................... 123/68; 123/70 R
(58) Field of Classification Search .................. 123/68, 123/70 R, 260, 305
See application file for complete search history.

(56) References Cited

U.S. PATENT DOCUMENTS

| 2,145,577 | A | * | 1/1939 | Barkeij | 123/310 |
| 2,191,746 | A | * | 2/1940 | Barkeij | 123/310 |
| 2005/0268609 | A1 | * | 12/2005 | Branyon et al. | 60/597 |

* cited by examiner

*Primary Examiner*—Noah Kamen
(74) *Attorney, Agent, or Firm*—Fildes & Outland, P.C.

(57) ABSTRACT

A split-cycle engine includes separate compression and expansion cylinders connected by a crossover passage. Crossover compression and expansion valves define a pressure chamber between them in the crossover passage for storing pressurized gas prior to timed delivery into the expansion cylinder. A fuel-air mixture is delivered into the expansion cylinder for ignition and expansion, developing power. One or more ignition sources, such as spark plugs, are positioned to encourage rapid combustion after ignition in the expansion cylinder but far enough from the crossover expansion valve(s) to prevent burning gases from reaching the crossover expansion valves before they are substantially closed to avoid entry of burning gas therein. A "safe distance" ("S") between the ignition source and an opening of the crossover expansion valve is expressed by the function: S (mm)=combustion speed (mm/crank angle degree)×crank angle degrees from ignition to crossover expansion valve closing.

8 Claims, 5 Drawing Sheets

US 7,690,337 B2

SPARK PLUG LOCATION FOR SPLIT-CYCLE ENGINE

CROSS REFERENCE TO RELATED APPLICATIONS

This application claims the benefit of U.S. Provisional Patent Application No. 60/963,742 filed Aug. 7, 2007.

TECHNICAL FIELD

The present invention relates to internal combustion engines. More specifically, the present invention relates to location of an ignition source in an expansion cylinder of a split-cycle engine to avoid entry of burning air/fuel mixture into one or more crossover passage expansion valve ports prior to expansion valve closing timing.

BACKGROUND OF THE INVENTION

For purposes of clarity, the following definition is offered for the term "split-cycle engine" as may be applied to engines disclosed in the prior art and as referred to in the present application.

A split-cycle engine as referred to herein comprises:

a crankshaft rotatable about a crankshaft axis;

a compression piston slidably received within a compression cylinder and operatively connected to the crankshaft such that the compression piston reciprocates through an intake stroke and a compression stroke during a single rotation of the crankshaft;

an expansion (power) piston slidably received within an expansion cylinder and operatively connected to the crankshaft such that the expansion piston reciprocates through an expansion stroke and an exhaust stroke during a single rotation of the crankshaft; and a crossover passage interconnecting the compression and expansion cylinders, the crossover passage including a crossover compression (XovrC) valve and a crossover expansion (XovrE) valve defining a pressure chamber therebetween.

U.S. Pat. No. 6,543,225 granted Apr. 8, 2003 to Carmelo J. Scuderi contains an extensive discussion of split-cycle and similar type engines. In addition, the patent discloses details of a prior version of an engine of which the present invention comprises a further development.

Referring to FIG. 1, an exemplary embodiment of the prior art split-cycle engine concept is shown generally by numeral 10. The split-cycle engine 10 replaces two adjacent cylinders of a conventional four-stroke engine with a combination of one compression cylinder 12 and one expansion cylinder 14. These two cylinders 12, 14 perform their respective functions once per crankshaft 16 revolution. The intake air and fuel charge is drawn into the compression cylinder 12 through typical poppet-style intake valves 18. The compression cylinder piston 20 pressurizes the charge and drives the charge through the crossover passage 22, which acts as the intake passage for the expansion cylinder 14.

A check type crossover compression (XovrC) valve 24 at the crossover passage inlet is used to prevent reverse flow from the crossover passage 22 into the compression cylinder 12. A crossover expansion (XovrE) valve 26 at the outlet of the crossover passage 22 controls flow of the pressurized intake charge such that the charge fully enters the expansion cylinder 14 shortly after the expansion piston 30 reaches its top dead center (TDC) position. Spark plug 28 is fired soon after the intake charge enters the expansion cylinder 14 and the resulting combustion drives the expansion cylinder piston 30 down toward bottom dead center (BDC). Exhaust gases are pumped out of the expansion cylinder through poppet exhaust valves 32.

With the split-cycle engine concept, the geometric engine parameters (i.e., bore, stroke, connecting rod length, compression ratio, etc.) of the compression and expansion cylinders are generally independent from one another. For example, the crank throws 34, 36 for each cylinder may have different radii and be phased apart from one another with top dead center (TDC) of the expansion cylinder piston 30 occurring prior to TDC of the compression cylinder piston 20. This independence enables the split-cycle engine to potentially achieve higher efficiency levels and greater torques than typical four stroke engines.

Because the crossover expansion (XovrE) valve 26 has only a short time (about 30 degrees crank angle) to discharge pressurized air/fuel mixture into the expansion cylinder prior to completion of the compression cylinder piston stroke, closing of the crossover expansion valve occurs after ignition of the air/fuel charge. It is desired for extended valve life to avoid entry of burning fuel mixture into the crossover expansion valve without shortening the valve closing timing.

SUMMARY OF THE INVENTION

In a split-cycle engine according to the invention, the spark plug, or plugs, is (are) located in the expansion cylinder at a "safe distance" from the crossover expansion (XovrE) valve (s) wherein burning mixture from the ignition point will not reach the XovrE valve(s) before their substantial closing. This requires consideration in the design process of cylinder flame speed in the range of engine speeds as well as other considerations for location of the spark plug in conventional engines.

An engine according to the invention may include:

a crankshaft rotatable about a crankshaft axis of the engine;

a compression piston slidably received within a compression cylinder and operatively connected to the crankshaft such that the compression piston reciprocates through an intake stroke and a compression stroke during a single rotation of the crankshaft;

an expansion piston slidably received within an expansion cylinder and operatively connected to the crankshaft such that the expansion piston reciprocates through an expansion stroke and an exhaust stroke during a single rotation of the crankshaft;

a crossover passage interconnecting the compression and expansion cylinders, the crossover passage including a crossover compression (XovrC) valve and a crossover expansion (XovrE) valve defining a pressure chamber therebetween;

a cylinder head closing an end of the expansion cylinder and having a crossover expansion valve port seating the crossover expansion valve, and an ignition source having an ignition source center spaced from a nearest peripheral edge of the port of the crossover expansion valve and which ignites an air/fuel mixture at a prescribed ignition timing to establish a flame front of burning gases in the expansion cylinder;

wherein the ignition source center is positioned at a distance from the nearest peripheral edge of the crossover expansion valve port that is at least as great as a determined "safe distance" to avoid travel of burning gases into said crossover expansion valve port prior to substantial closing of said valve over at least a portion of engine operating speeds, and the safe distance "S" is expressed by the function:

$S$(millimeters)=combustion speed (millimeters/crank angle degree)×crank angle degrees from ignition to crossover expansion valve closing.

Additional features may include:

The ignition source center is located sufficiently far from the cylinder wall to avoid cooling and quenching of the flame after ignition and not so far from cylinder walls as to overly extend burning time of the charge and cause self-ignition beyond the flame front.

The center of the ignition source is located at least 12 mm from a nearest peripheral edge of an exhaust valve in the cylinder head to allow space for adequate cooling of the cylinder wall adjacent the ignition source.

These and other features and advantages of the invention will be more fully understood from the following detailed description of the invention taken together with the accompanying drawings.

DETAILED DESCRIPTION OF THE INVENTION

Figure 2:
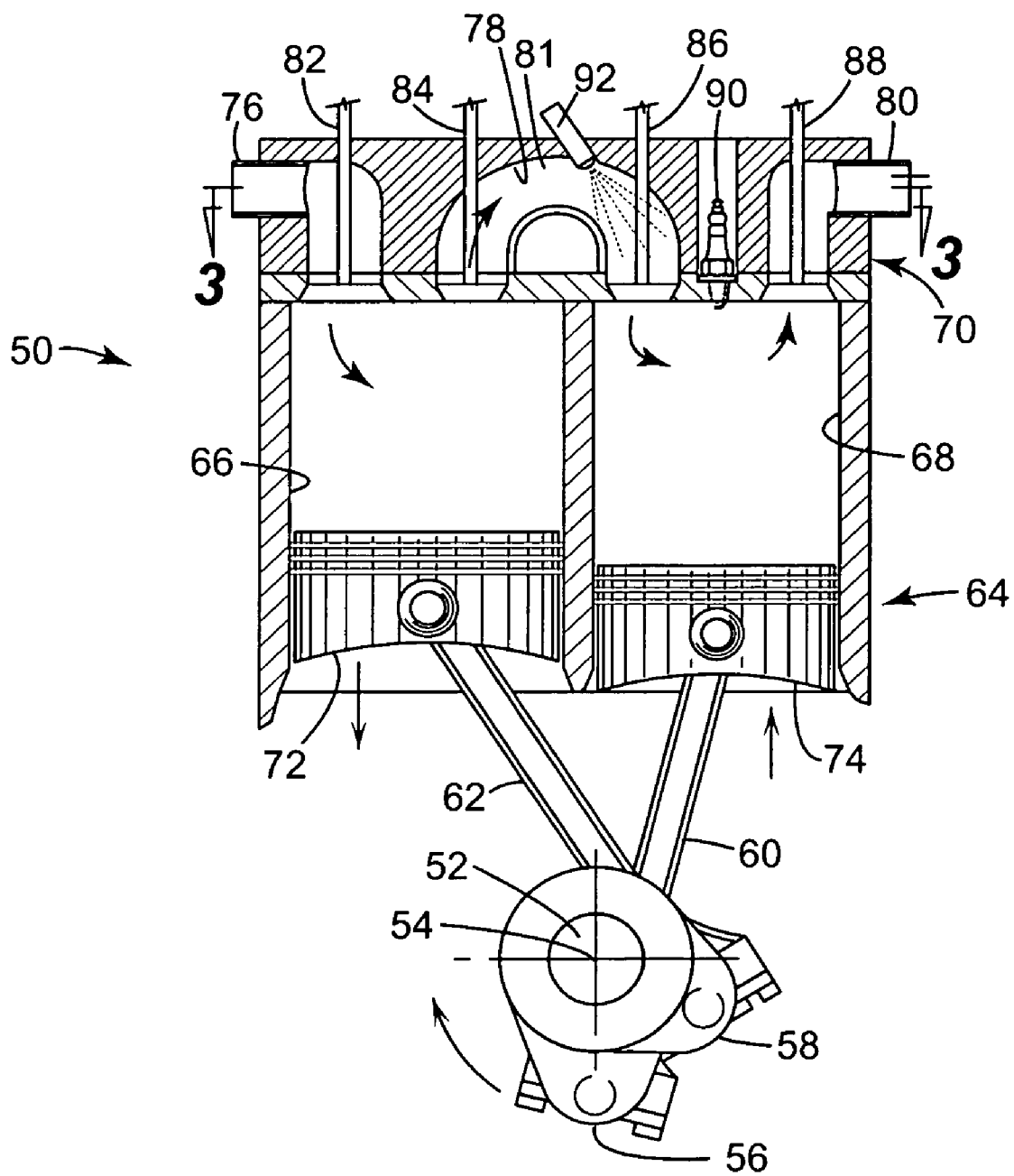
FIG. 2 is a transverse cross-sectional view of an exemplary split-cycle engine according to the present invention.
Figure 3:
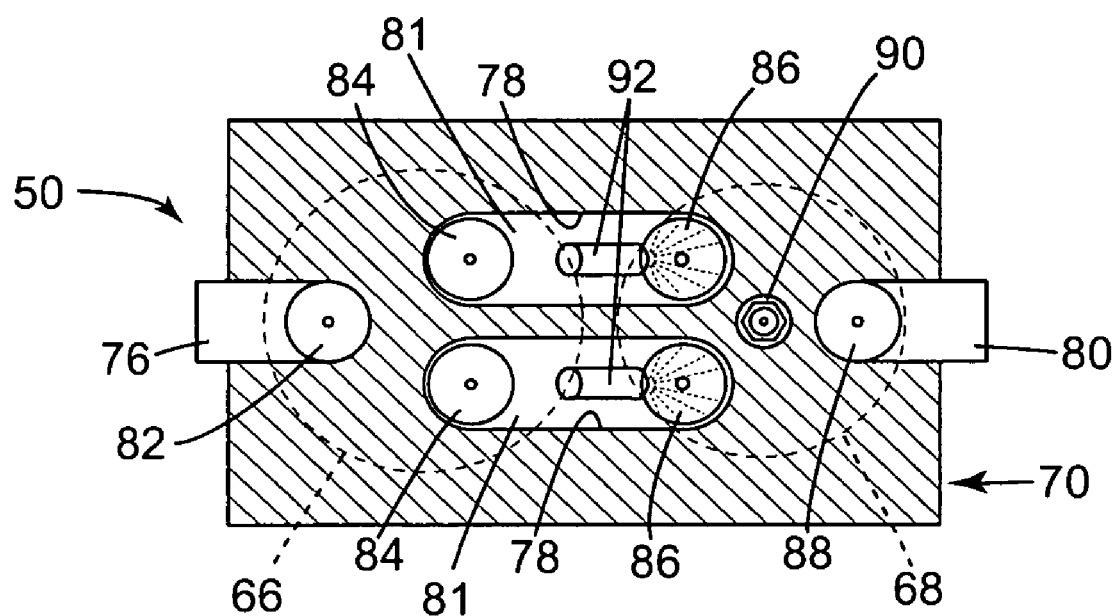
FIG. 3 is a cross-sectional top view of the split-cycle engine taken through line 3-3 of FIG. 2 with fuel injectors superimposed.

Referring now to FIGS. 2 and 3 of the drawings in detail, numeral 50 generally indicates a diagrammatic representation of a split-cycle engine according to the invention. Engine 50 includes a crankshaft 52 rotatable about a crankshaft axis 54 in a clockwise direction as shown in the drawing. The crankshaft 54 includes adjacent angularly displaced leading and following crank throws 56, 58, connected to connecting rods 60, 62, respectively.

Engine 50 further includes a cylinder block 64 defining a pair of adjacent cylinders, in particular a compression cylinder 66 and an expansion cylinder 68 closed by a cylinder head 70 at one end of the cylinders opposite the crankshaft 52.

A compression piston 72 is received in compression cylinder 66 and is connected to the connecting rod 62 for reciprocation of the piston between top dead center (TDC) and bottom dead center (BDC) positions. An expansion piston 74 is received in expansion cylinder 68 and is connected to the connecting rod 60 for similar TDC/BDC reciprocation.

In an exemplary embodiment, the cylinder head 70 provides the means for gas flow into, out of and between the cylinders 66, 68. In the order of gas flow, the cylinder head includes an intake port 76 through which intake air is drawn into the compression cylinder 66, dual crossover (Xovr) passages 78 (at least one passage required), through which compressed air (gas) is transferred from the compression cylinder 66 to the expansion cylinder 68, and an exhaust port 80 through which spent gases are discharged from the expansion cylinder. Each crossover passage 78 also defines a pressure chamber 81 in which pressurized gas is stored when the crossover compression and expansion valves are closed.

Gas flow into the compression cylinder 66 is controlled by an inwardly opening poppet type intake valve 82. Gas flow into and out of each crossover passage 78 may be controlled by a pair of outwardly opening poppet valves, i.e. crossover compression (XovrC) valves 84 at inlet ends of the crossover passages and crossover expansion (XovrE) valves 86 at outlet ends of the crossover passages. Exhaust gas flow out the exhaust port 80 is controlled by an inwardly opening poppet type exhaust valve 88. These valves 82, 84, 86 and 88 may be actuated in any suitable manner such as by mechanically driven cams, variable valve actuation technology, or the like.

With continued reference to FIGS. 2 and 3 of the drawings, the exemplary engine 50 also includes one or more spark plugs 90 or other ignition sources located at appropriate locations in the end of the expansion cylinder wherein a mixed fuel and air charge may be ignited and burn during the expansion stroke.

Also the engine requires at least one fuel injector 92 operative to inject fuel into a charge of compressed air within at least one (or both) of the crossover passages 78 and pressure chambers 81.

Figure 4:
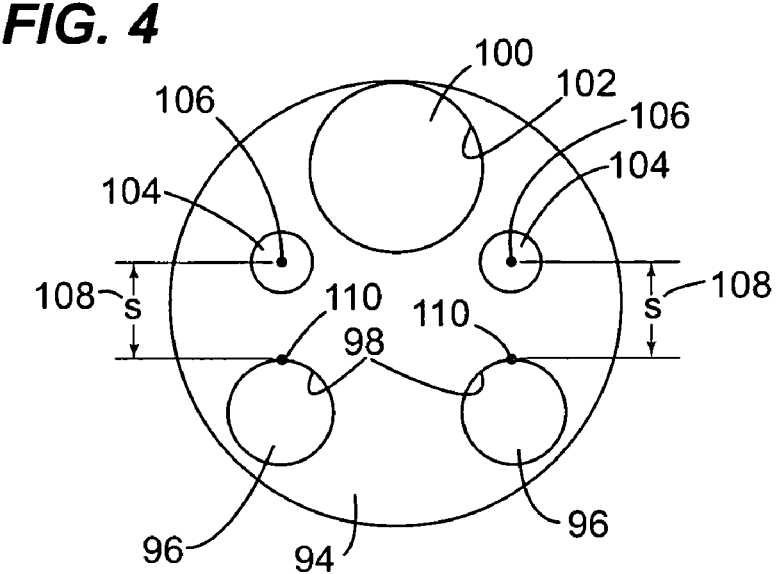
FIG. 4 is a bottom face view of the cylinder head showing key dimensions with relative locations of valves and ignition sources.

With reference to FIG. 4, an embodiment of the spark ignition (SI) split-cycle engine 50 as shown has a cylinder head face 94 with dual crossover expansion (XovrE) valves 96 seated in XovrE valve ports 98, wherein the XovrE valves open outwardly relative to the expansion cylinder 68 (not shown).

Cylinder head face 94 also includes at least one exhaust valve 100 seated in an exhaust valve port 102 and at least one ignition source 104, such as a spark plug, a glow plug, a switched laser or any controlled means of raising the fuel/air temperature sufficiently, at a location, to establish the start of combustion at that location. As discussed in greater detail herein, the center 106 of each ignition source 104 is located a safe distance "S" (designated with reference number 108) from a nearest peripheral edge 110 of each XovrE valve port 98. The relative positions of the XovrE valves 96, exhaust valve 100 and ignition sources 104 are important to:

a) ensure good fuel mixing;
b) promote appropriate charge motion in the cylinder;
c) avoid flame burning into the crossover passage;
d) avoid self-ignition ("detonation") of the fuel/air mixture before flame arrival. (Detonation is a phenomenon of uncontrolled self-ignition of pockets of unburned fuel and air which should generally be avoided in most spark-ignition engine operation); and
e) achieve adequately fast burn before the piston descends too far.

There is an advantage to having twin ignition sources 104, in that the rate of burning is increased, and more importantly for the split-cycle engine 50, the use of twin ignition sources 104 provides more flexibility in realizing the minimum safe distance 108 from the nearest peripheral edge 110 of the XovrE valve port 98. This is because a single ignition source is usually placed at the center of the cylinder in order to provide equal flame path travel in all directions, thus providing relatively fast burn times compared to ignition sources that are offset. However, a central ignition source is not ideal for the split-cycle engine 50 as the center of a centrally located ignition source will tend to be closer to a nearest peripheral edge of the XovrE valve port 98 than the centers 106 of twin ignition sources 104 and will therefore be less likely to meet the minimum safe distance criterion versus twin ignition sources. Twin ignition sources 104 can be moved further from the cylinder center and the nearest peripheral edge of the XovrE valve port 98, while still achieving adequately fast burn times.

There are three main parameters which affect the selected location of the ignition sources 104 in the split-cycle engine 50:

Parameter 1. Distance to Nearest Peripheral Edge 110 of XovrE Valve Ports 98

Figure 5:
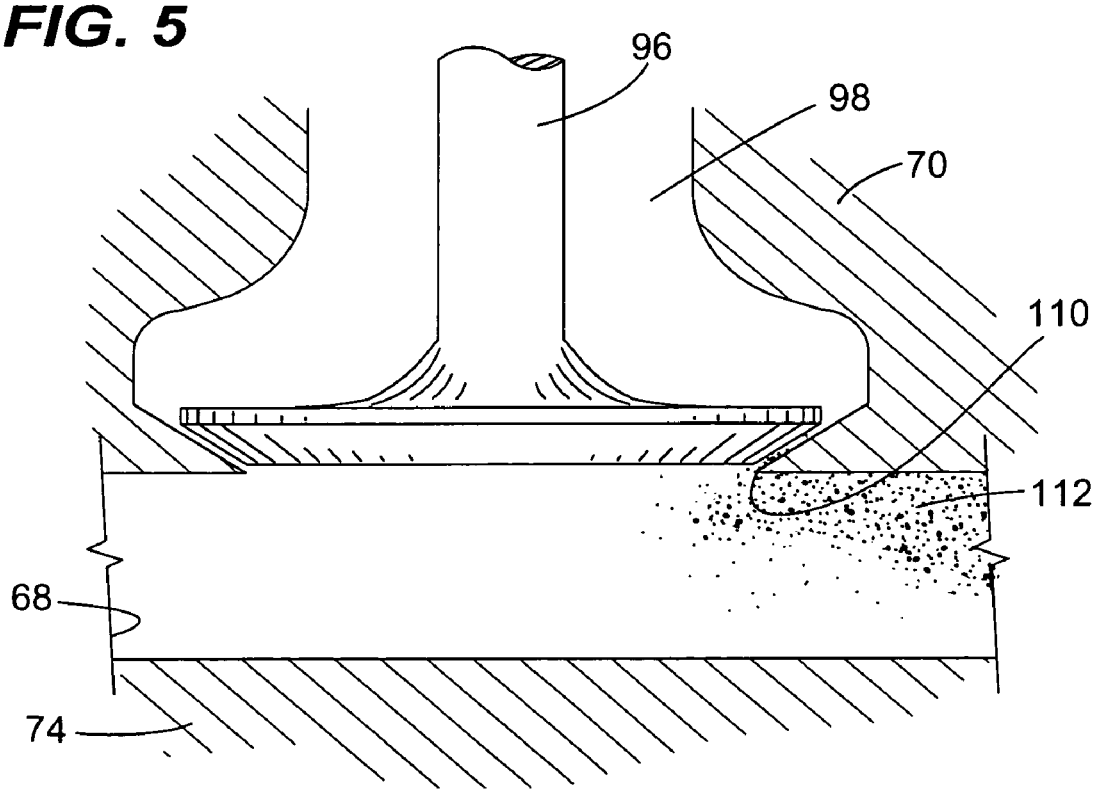
FIG. 5 is an illustration of flame penetration into a XovrE valve seat at 25 degrees ATDC, as the valve is closing.

Referring to FIG. 5, in order to achieve combustion as close as possible to TDC in the split-cycle engine 50, it is necessary for ignition to occur before the XovrE valves 96 have closed. However, it is also important to avoid flame 112 travel into the XovrE valve ports 98 for reasons of XovrE valve 96 durability and thermal efficiency losses. The centers 106 of the ignition sources 104 therefore need to be positioned sufficiently far from the nearest peripheral edge 110 of the XovrE valve ports 98 to allow the XovrE valves 96 to have substantially closed before the flame 112 reaches them. "Substantial" closure is taken to be at 23 degrees after top dead center (ATDC), as far as flame 112 penetration safety is concerned, though actual valve 96 closing is at 25 degrees ATDC. FIG. 5 shows that the flame 112 has reached, penetrated and overlapped the valve 96 at 23 degrees ATDC, but this is taken as acceptable as the valve/seat clearance is less than 0.5 mm at 23 degrees ATDC when the flame arrives at the nearest peripheral edge 110 of the crossover expansion valve port 98.

Parameter 2. Distance to Cylinder Wall 68

Firstly, an ignition source 104 which is too close to the cylinder wall 68 (bore) can result in cooling and quenching of the flame 112, which is not ideal for promoting combustion in the early burning phase.

Secondly, an ignition source 104 which is too distant from any of the cylinder walls 68 will result in an extended burning time for the flame 112 to reach unburned mixture. This impairs thermal efficiency, and can result in self-ignition (detonation) of the unburned mixture, due to compression of the unburned mixture and radiant heat transfer from the flame prior to flame arrival at the unburned mixture location.

For the first reason, the first and second ignition sources 104 are also typically at least 20% of the cylinder bore diameter from the periphery of the cylinder bore 68. For the second reason, a single ignition source 104 should not be more than ~60% of the cylinder bore diameter from any part of the cylinder wall area at the top of the cylinder bore 68.

Parameter 3. Distance to Nearest Peripheral Edge of Exhaust Valve Port 102

Adequate cooling passages, not shown, are necessary in the cylinder head water jacket between the spark plug boss, not shown, and the exhaust port 102 opening. The minimum distance is usually governed by casting limitations such as the minimum cast wall thickness that is possible as well as the minimum sand core section that is feasible for forming the cooling jacket. This requirement generally needs a minimum of 12 mm between the center 106 of the ignition source 104 and the nearest peripheral edge of the exhaust valve port 102.

Figure 6:
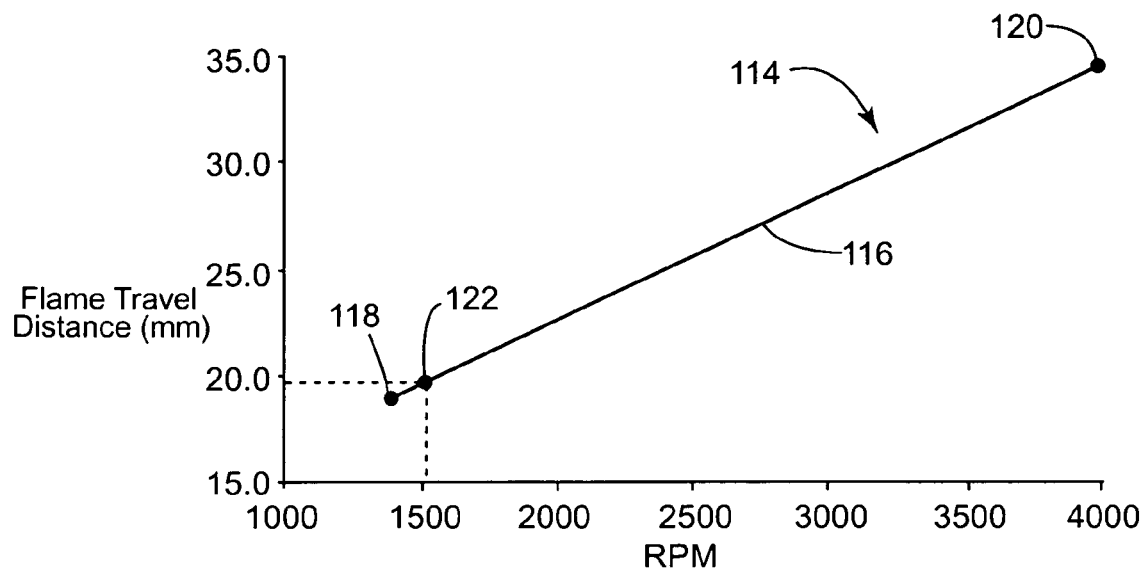
FIG. 6 is a line graph of predicted "safe distance" between the ignition source center and the nearest peripheral edge of the XovrC valve port vs. engine speed.

Referring to FIG. 6, graph 114 is derived from combustion computational fluid dynamics (CFD) prediction results and illustrates the significance of parameter 1 to the split-cycle engine 50. Line 116 depicts the distance traveled by the flame 112 (vertical axis of graph 114), from start of ignition to the point of crossover expansion valve 96 closing, versus engine speed (horizontal axis of graph 114) at full load conditions. If the ignition source 104 distance 108 from the nearest peripheral edge 110 of the XovrE valve port 98 is greater than the value indicated by line 116, this arrangement avoids flame 112 penetration into the crossover expansion valve port 98 before the crossover expansion valve 96 closes and may be called the "Safe Distance (S)." If the distance is less than the value indicated by line 116, this arrangement will result in flame penetration into the crossover expansion valve port 98 before the crossover expansion valve 96 closes. Graph 114 also shows that the theoretically safe distance is ~19 mm at 1400 rpm, flame speed 2.14 mm/deg. (point 118) and 35 mm at 4000 rpm, flame speed 5.74 mm/deg. (point 120). Point 122 is the actual location of the ignition sources 104 as modeled in the CFD analysis which generated this graph 114. Point 122 represents a safe distance of 19.8 mm to enable optimum ignition at 1500 rpm for engine 50.

The gradient of line 116 is dependent on both the combustion speed (speed of flame 112 front) at each engine speed, and the time from start of ignition, which varies at full load from ~14-20 degrees ATDC, to closing of the crossover expansion valve 96 at 25 degrees ATDC. For conventional 2 and 4-stroke combustion, the main combustion speed increases linearly with increasing engine speed while the time available for combustion to progress and complete reduces linearly with increasing engine speed, these two factors resulting in an approximately constant angular period for complete combustion across the engine speed range. For the split-cycle engine 50, based on the CFD combustion predictions, the combustion speed at 4000 rpm is approximately 2.5 times higher than the combustion speed at 1400 rpm in a single plane ~1 millimeter (mm) below the cylinder head face 94, defined in millimeters/crank angle degree, and so approximately 1.8 times greater distance is required between the ignition source 104 and the crossover expansion valve 96 at 4000 rpm than the safe distance required at 1400 rpm.

The discrepancy between the 1.8 times "safe distances," and the 2.5 times angular combustion speed at 4000 rpm and 1400 rpm is probably due to several factors, the most significant being the longer angular period (9 degrees crank angle) at 1400 rpm from ignition (14 degrees ATDC) to the safe closing point of the XovrE valve 96 (23 degrees ATDC), versus the equivalent period of 6 degrees ATDC at 4000 rpm, due to the retarded ignition timing of 17 degrees ATDC at 4000 rpm, the latter having been an early best estimate of ignition timing to avoid flame penetration into the XovrE port 98. If it is physically impossible to achieve the required safe distances between ignition source center 106 and the nearest peripheral edge 110 of the crossover expansion valve port 98, then the ignition must be delayed further from its timing after TDC and this will impair engine thermal efficiency.

Figure 7:
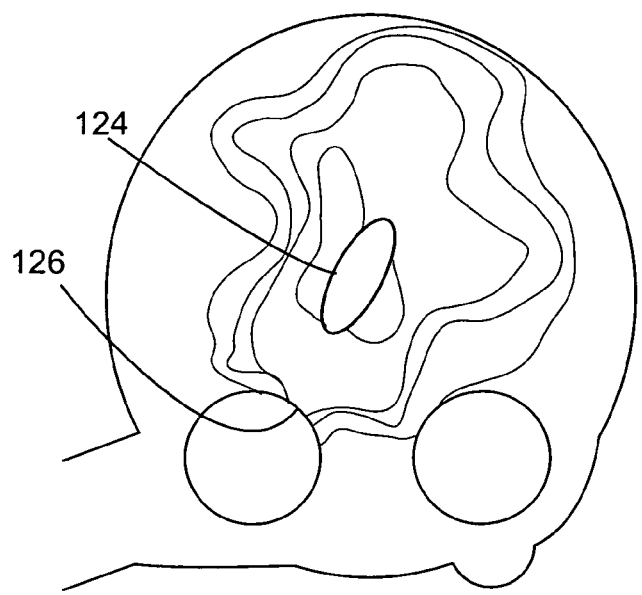
FIG. 7 is a two-dimensional diagram showing calculated flame progression at 1400 rpm from ignition at 14 degrees ATDC to 23 degrees ATDC.

Referring to FIG. 7, the approximate flame path travel between the ignition source 104 and the nearest peripheral edge 110 of the crossover expansion valve port 98 is deduced at 1400 rpm by scaling the CFD contours of combustion progression, the flame front being taken as the 2000 degree K contour. In the example of FIG. 7, which is for a single central ignition, the 17 degrees ATDC contour is approximated as a simple white ellipse 124, progressing to the 23 degrees ATDC contour 126 at which combustion just reaches the nearest peripheral edge of the crossover valve port before the crossover valve's closure at 25 degrees ATDC. In FIG. 7, the scaled distance is approximately 19 mm and this corresponds to the safe distance at 1400 rpm (point 118) in FIG. 6.

Referring to FIG. 6, the combustion speeds at 1400 rpm in the XovrE valve 96 direction can be calculated from the distance traveled between the two positions on the two 2000 degree K flame fronts, divided by the time or angular increments between each flame front at 1400 rpm. These coarsely averaged combustion speeds at 1400 rpm are 18 meters/second (m/s), or 2.14 mm/crank degree, while the corresponding values at 4000 rpm are 138 m/s, or 5.74 mm/crank degree, both these latter numbers having been incremented by nominal 30% from the scaled values to correct for the use of a lean air/fuel ratio in the 4000 rpm CFD calculations.

Figure 1:
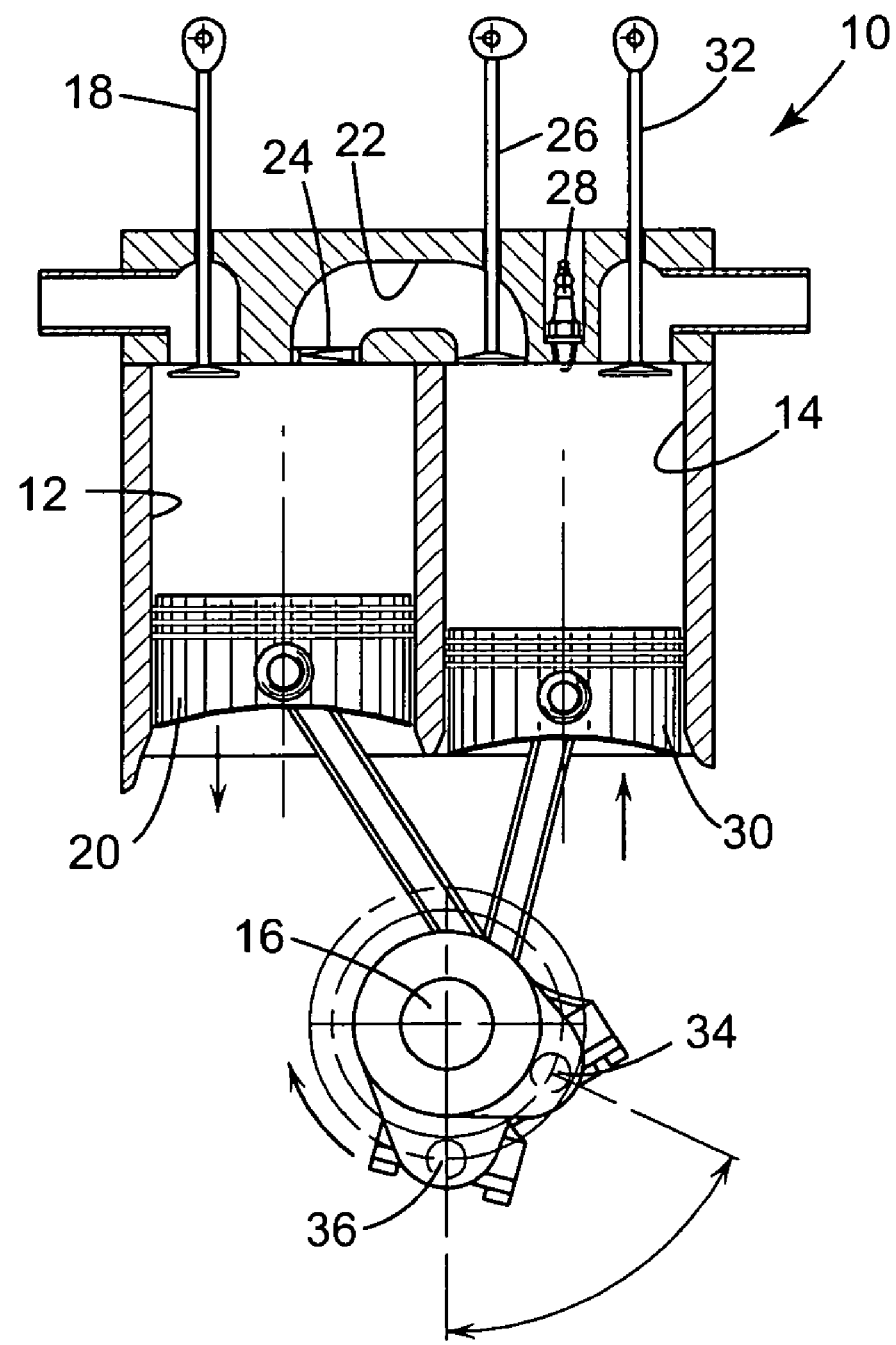
FIG. 1 is a transverse cross-sectional view of a prior art split-cycle engine related to the engine of the invention.

For split-cycle engine 50 combustion chamber arrangements for gasoline fuels (as per FIG. 1 and FIG. 3), according to Parameter 1, the safe distance should be greater than 35 mm; a lesser distance than 35 mm will imply thermal efficiency losses at 4000 rpm. For lower speeds, the safe distance can be reduced, for example to ~19 mm at 1400 and probably pro rata between 19 and 35 mm for intermediate speeds. For example, a design value for the distance between the ignition source center 106 location and the nearest peripheral edge 110 of XovrE valve port 98 of 19.8 mm provides optimum ignition up to ~1500 rpm (point 122 in FIG. 6).

For greater safe distances, which would enable optimum ignition timing up to ~4000 rpm, the ignition sources 104 should be moved closer towards the exhaust valve 100 (as per Parameters 2 and 3) and the crossover expansion valves 96 moved further from the ignition sources 104. A compromise has to be made because of the limited cylinder bore 68 size and the size of the exhaust valves 100, and it should be remembered that very off centered ignition arrangements are harmful to fast burn and to detonation, in most cases. The benefit of "inadequate" safe distance, such as 19.8 mm, is that better burn times will be maintained for part load conditions where much lower combustion speeds are expected as a natural consequence of throttled engine operation. However, for hybrid applications, more full load operation would be required and this would probably demand the safe distances shown in FIG. 6.

It can be said that, subject to further knowledge of combustion speeds for the split-cycle engine 50, the predicted 19-35 mm safe distance between ignition source center 106 and the nearest peripheral edge 110 of the XovrE valve ports 98, for 1400-4000 rpm full load operation, is an absolute number applicable to all cylinder bore sizes for split-cycle engines operating on gasoline fuels. The safe distances would change if fuels with higher laminar combustion speeds are used, or if some means is found for increasing the burning velocities, e.g. increased turbulence. Similar safe distances could be calculated for diesel operation, pending availability of CFD predictions.

In summary, the safe distance "S" for any split-cycle engine can be generally specified by the following relationship:

$S$(mm)=combustion speed(millimeter/crank angle degree(mm/CAD))×crank angle degrees from ignition to $XovrE$ valve closing More easily, S can be scaled from CFD results showing ~23 degrees ATDC flame contour distance traveled from the ignition source for the operational speed range of the engine at full load, and the highest safe value distance selected according to the expected duty cycle of the engine; above this selected speed, ignition would be retarded to avoid burning into the XovrE valve port 98.

The above expression can also be expressed in an analogous equation with combustion speed in m/s and time for combustion in seconds, as calculated from the engine speed and crank angle.

According to Parameter 2, both centers 106 of ignition sources 104 should be ~20% of the bore diameter from the periphery of cylinder bore 68, and according to Parameter 3, both centers 106 of ignition sources 104 should be at least 12 mm from the nearest peripheral edge of the exhaust valve port 102.

This arrangement provides a combustion system which avoids burning into the crossover expansion valve port 98 before the crossover expansion valve 96 closes, while also achieving an optimum tradeoff between burning of the full cylinder 68 contents and avoidance of detonation.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. An internal combustion engine comprising:
a crankshaft rotatable about a crankshaft axis of the engine;
a compression piston slidably received within a compression cylinder and operatively connected to the crankshaft such that the compression piston reciprocates through an intake stroke and a compression stroke during a single rotation of the crankshaft;
an expansion piston slidably received within an expansion cylinder and operatively connected to the crankshaft such that the expansion piston reciprocates through an expansion stroke and an exhaust stroke during a single rotation of the crankshaft;
two crossover expansion valve ports, each of the two crossover expansion valve ports seating a corresponding crossover expansion valve;
a crossover passage interconnecting the compression and expansion cylinders, the crossover passage including a crossover compression (XovrC) valve and at least one of the two crossover expansion (XovrE) valves, the crossover passage defining a pressure chamber between the crossover compression (XovrC) valve and the least one of the two crossover expansion (XovrE) valves;
a cylinder head closing an end of the expansion cylinder and including the two crossover expansion valve ports; and
two ignition sources disposed in the expansion cylinder, each of the two ignition sources including an ignition source center, the two ignition sources operable to ignites an air/fuel mixture to establish a flame front of burning gases in the expansion cylinder;
wherein, for each of the two ignition source centers, a distance from the respective ignition source center to a nearest peripheral edge of the two crossover expansion valve ports is greater than a distance from a center of the expansion cylinder to a nearest peripheral edge of the two crossover expansion valve ports.

2. The engine of claim 1 wherein each of the two ignition source centers are at least a safe distance (S) from a respective nearest peripheral edge of the two crossover expansion valve ports, and wherein the safe distance (S) is generally 19 millimeters (mm) or more.

3. The engine of claim 2 wherein the safe distance (S) is generally in the range of 19 mm to 35 mm.

4. The engine of claim 1 wherein each of the two ignition source centers are located sufficiently far from the cylinder wall to avoid cooling and quenching of the flame after ignition.

5. The engine of claim 4 wherein each of the two ignition source centers are located not farther than 60 percent of the expansion cylinder diameter from any part of the expansion cylinder wall adjacent the expansion cylinder closed end.

6. The engine of claim 4 wherein each of the two ignition source centers are located at least 20 percent of the cylinder diameter from the expansion cylinder wall adjacent the expansion cylinder closed end.

7. The engine of claim 1 wherein the cylinder head includes an exhaust port seating an exhaust valve, and the center of each of the two ignition sources are located at least 12 mm from a respective nearest peripheral edge of the exhaust port to allow space for adequate cooling of an expansion cylinder wall adjacent each of the two ignition sources.

8. The engine of claim 1 wherein the crossover compression valve opens outwardly away from the compression cylinder, and wherein the two crossover expansion valves open outwardly away from the expansion cylinder.

* * * * *